3,428,684
PURIFICATION OF ALKANOL AMINES
John B. Tindall, Terre Haute, Ind., assignor to Commercial Solvents Corporation, New York, N.Y., a corporation of Maryland
No Drawing. Filed Nov. 2, 1966, Ser. No. 591,444
U.S. Cl. 260—584       14 Claims
Int. Cl. C07c 89/04

This invention relates to purification of alkanolamines. In a particular aspect it relates to the purification of crude 2-amino-1,3-propanediol; 2-amino-2-methyl-1,3-propanediol; 2-amino-2-ethyl-1,3-propanediol; 2-amino-2-propyl-1,3-propanediol; and 2-amino-2-hydroxymethyl-1,3-propanediol.

Alkanolamines have many uses. For example, they are useful as emulsifying agents in the form of their soaps with fatty acids. Another use, with the exception of 2-amino-1,3-propanediol, is in the preparation of vinyl oxazoline drying oils which are used as the vehicle in paints, varnishes and enamels. It is important that these vinyl oxazoline drying oils be as nearly colorless as possible so that the resulting paint or varnish will have the intended color upon drying. Discoloration is also undesirable in many emulsions, especially cosmetic creams and lotions, and bad odor is undesirable in nearly all uses.

The alkanolamines which can be purified by the process of this invention are produced by the hydrogenation of the corresponding nitroalkanols which in turn are prepared from nitroalkanes. The crude alkanolamines resulting from the hydrogenation step usually contain a large fraction of impurities resulting from side reactions during hydrogenation and from the use of impure nitroalkanol starting materials. Most of these impurities have not been identified but consist primarily of non-alkaline compounds and monohydroxy amines. In a typical sample more than 40 different compounds can be detected by gas chromatograph analysis. These impurities, even in very small amounts, e.g., less than about 1%, cause color formation in vinyl oxazoline drying oils. They also contribute bad odor to the alkanolamine and to emulsions and drying oils prepared therefrom. The impurities causing color formation and bad odor have not been identified but have been isolated as a very dark, water-insoluble oil with a strong odor. It is non-alkaline, strongly absorbs ultra-violet radiation and reduces permanganate ion.

This oil fraction is difficult to separate from the alkanolamines. Heretofore, purification could be effected by extraction of aqueous solutions of the alkanolamine with a solvent, such as a mixture of toluene and butanol, or by treatment of the aqueous solution with a large volume of carbon black. It has also been possible to obtain 2-amino-2-ethyl-1,3-propanediol in satisfactory purity by recrystallization from a non-aqueous solvent mixture, i.e., butanol-toluene, benzene-isopropyl alcohol and the like. Recrystallization from water is satisfactory for purification of some alkanolamines but not for all. None of these processes has been economically satisfactory, however, due to high losses of the carbon black, the solvent or the alkanolamine itself, depending on the process employed. As a result, discolored and malodorous alkanolamines have been banned from use in many emulsions, and the vinyl oxazoline drying oils prepared therefrom have been limited to colored coatings where a high degree of color can be tolerated.

2-amino-1,3-propanediol can be highly purified by the known processes, although at high cost, and also by the process of this invention. When purified, it produces emulsions of satisfactory color and odor, but drying oils prepared from it are consistently highly colored. This high color is believed inherent in the molecular structure of the resulting drying oils rather than due to the presence of impurities.

Attempts have been made to use other adsorbents than carbon black for the purification of the above-described alkanolamines, but heretofore no satisfactory adsorbents were found. Those tried, unsuccessfully, included a molecular sieve or zeolite; silica gel; cross-linked ion-exchange resins ("Amberlite" A–26, a macroreticular, strongly basic anion exchange resin; "Amberlite" 1R–120, a strongly acidic, sulfonic styrene-divinylbenzene copolymer; and "Amberlite" IRA–410, a strongly basic amine-type anion exchange resin); activated alumina; Florasil (a synthetic magnesia-silica gel); Lloyd's Reagent (hydrated aluminum silicate); and Superfiltrol (an aluminum silicate clay).

It is an object of this invention to provide a method for the purification of alkanolamines.

Another object of this invention is to provide a method for the purification of 2-amino-1,3-propanediol; 2-amino-2-methyl-1,3-propanediol; 2 - amino - 2-ethyl-1,3-propanediol; 2-amino-2-propyl-1,3-propanediol; and 2-amino-2-hydroxymethyl-1,3-propanediol.

A third object of this invention is to provide alkanolamines having a mild odor.

Still another object of this invention is to provide vinyl oxazoline drying oils having a pale color.

Other objects will be apparent to those skilled in the art from the description of this invention.

The discovery of this invention is a process for the purification of a malodorous alkanolamine containing color-producing impurities. The alkanolamine which can be purified by the process of this invention corresponds to the general formula:

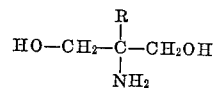

where R can be hydrogen, an alkyl radical of from 1 to 3 carbon atoms or hydroxymethyl. The process comprises contacting an aqueous solution of the alkanolamine with an adsorbent resin capable of adsorbing malodorous, color-producing impurities therefrom, e.g., a non-ionic, cross-linked copolymer of styrene and divinylbenzene, in an amount and for a length of time sufficient to effect substantial separation of the malodorous, color-producing impurities from the alkanolamine.

The alkanolamines which can be purified by the present process include, but are not limited to 2-amino-1,3-propanediol; 2-amino-2-methyl-1,3-propanediol; 2-amino-2-ethyl-1,3-propanediol; 2-amino-2-propyl-1,3-propanediol; and 2-amino-2-hydroxymethyl-1,3-propanediol.

In the practice of this invention, the alkanolamine is usually received from the hydrogenation step in the form of an aqueous-alcoholic solution which has been filtered to remove the hydrogenation catalyst. The alcohol, e.g., methanol, ethanol or 2-propanol, is distilled off by heating the hydrogenation product to a temperature of about 100° C. at atmospheric pressure in a distillation kettle, and the water content is adjusted to form a feedstock solution having approximately 15% to approximately 40% by weight alkanolamine which is then contacted with the resin capable of adsorbing the malodorous, color-producing impurities.

The feedstock solution can be contacted with the resin by any satisfactory method, several of which are known. Preferably, the feedstock solution is passed continuously through the resin bed until the effluent approaches the quality of the feedstock as described in detail below. The effluent is then evaporated in an evaporator to remove the water, as is known in the art, and is then heated in a distillation kettle and column to a temperature of about 150° C. at 15 mm. to remove minor amounts of low-boiling amines and alkanolamines related to the principal alkanolamine.

Generally, the pot residue is of satisfactory quality, but when preferred, it is further purified by vacuum distillation or vacuum-steam distillation.

In an alternate preferred procedure, the alcohol is removed from the hydrogenation product by distillation as previously described, and the distillation is continued to about 150° C. at reduced pressure, e.g., at about 15 mm., to strip off all low-boiling impurities including the water and related amines and alkanolamines. The residue is redissolved in sufficient water to form a feedstock solution containing from about 15% to about 40% by weight alkanolamine, and the solution is contacted with the resin as herein set forth. The effluent from the resin treatment is suitable for some uses without further treatment, as in formation of emulsions. However, for use in preparation of vinyl oxazoline drying oils the water is preferably reduced to below 5% by weight by evaporation.

When the hydrogenation product is determined to be of poor quality, the alcohol, water and low-boilers are distilled off by heating to a temperature of about 150° C. at 15 mm. Hg pressure, and then the residue is vacuum distilled to a temperature of about 150° C. at a suitable pressure, or preferably vacuum-steam distilled at 15 mm. Hg pressure or less.

The distilled residue containing the alkanolamine and the malodorous, color-producing impurities is then dissolved in water to form a 15 to 40% by weight solution and is passed through the resin bed as herein set forth. The effluent from the resin treatment is suitable for some uses without further treatment, or the water content can be partially or wholly evaporated.

The distillation techniques and equipment employed in the steps described above are those well known to those skilled in the art.

The concentration of alkanolamine in the feedstock solution is not limited to 15% to 40% by weight but is selected to provide a convenient rate of flow through the resin bed consistent with the desired quality of effluent. A concentration above 40% by weight alkanolamine generally gives unsatisfactory results, whereas a concentration below 15% requires an excessively long processing time due to the large volume; furthermore evaporation of the water therefrom in the succeeding step becomes burdensome. Preferably, the alkanolamine content is within the range of from approximately 25% by weight to approximately 35% by weight; 30% by weight has been found to be a convenient concentration.

The temperature at which the alkanolamine solution is conducted through the resin bed can vary from ambient temperatures to elevated temperatures. Elevated temperatures tend to reduce the viscosity of the more concentrated solutions but do not appreciably affect the adsorption of the malodorous, color-producing impurity. Generally, it is preferred to select a concentration of alkanolamine which can be conveniently processed at ambient temperature, i.e., from about 15% to about 40% by weight alkanolamine.

The ratio of alkanolamine to volume of resin can be varied considerably within the concept of this invention. The ratio can be varied in accordance with the quality of the crude alkanolamine as received and in accordance with the quality of the effluent desired. Generally, one cubic foot of resin is used to treat as little as about 20 lb. of alkanolamine, dry basis, in a poor quality feedstock or as much as about 150 lb. of vacuum distilled alkanolamine. Up to an additional 110 lb. for a total of 260 lb. alkanolamine, dry basis, can be advantageously improved by the treatment and this fraction can either be recirculated to the feedstock for re-treatment or it can be recovered for uses where high color stability is not essential.

The rate of throughput of alkanolamine solution through the resin bed can be varied considerably within the concept of this invention. The rate can be varied in accordance with the quality of the crude alkanolamine, the concentration thereof and the quality of effluent desired. A low rate of throughput leads to an undesirably long processing time, whereas a high rate of throughput leads to a lower quality of effluent. As little as 6 gal./hr. and as high as 45 has given satisfactory results. Generally, a throughput rate per hour per cubic foot of resin of from approximately 20 to 40 gallons of a 20% to 40% by weight alkanolamine solution is satisfactory, and from 25 to 35 gallons per cubic foot per hour is preferred.

Conventional equipment is employed for the process of this invention. The resin bed is preferably contained in a column-type vessel constructed of ordinary steel. Generally, 20 ft.$^3$ of resin will provide a capacity of approximately 10,000 lb. per day of product, and an upward flow with gravity feed is preferred. Top and bottom screens are employed to secure the resin bed in place. Meters are preferably used to regulate the flow of product feed and during the resin regeneration step, the water wash and methanol wash.

Generally, the effluent is collected from the column until a potassium permanganate test shows the quality is decreasing significantly. According to the test, 10 millimoles of amine, calculated as the principal alkanolamine, are diluted to 20 ml. with distilled water, acidified with 4 ml. of 6 N sulfuric acid, and 1 ml. of 0.1% aqueous potassium permanganate is added. The solution is mixed well and allowed to stand until the pink color is discharged. If the pink color is retained for at least 8 minutes, the effluent is determined to be of good quality. However, if desired, the effluent can continue to be collected until the permanganate time has dropped to as low as about 3 minutes. This portion of the effluent, i.e., the portion having a permanganate time of 3 to 8 minutes, is preferably recycled to the resin treating step or it is directed to uses where a high degree of purity is not essential.

When the permanganate time drops below about 3 minutes, the resin bed is regenerated by reverse flushing with two bed-volumes of distilled or condensate water until the effluent is neutral, followed by washing with about one bed-volume of methanol to desorb the impurities. Then the methanol is removed by washing the resin bed with two additional bed-volumes of water. The resin is then ready for reuse.

The water used for preparing the alkanolamine feedstock and for other processing steps should have low solids content to minimize contamination of the final product. When the product is to be redistilled, i.e., as described in the third embodiment, the quality of the water is of less importance. De-ionized water obtained by treatment of the water supply with an ion-exchange resin is preferred.

The resin employed for the resin-treating step is a non-ionic cross-linked copolymer of styrene and divinylbenzene. The preferred resins are those marketed by Rohm and Haas Company, Philadelphia, Pa., under the trademarks Amberlite XAD-1 and Amberlite XAD-2. They are described as having the ability to selectively adsorb water-soluble organic substances, particularly those having hydrophobic and hydrophilic sections in the molecular structure. Fatty amines are said to be strongly adsorbed in the free base form by these resins. The particularly preferred resin is Amberlite XAD-2 because it gives markedly more satisfactory results than the XAD-1 resin.

Amberlite XAD-2 resin is reported by the manufacturer to have the following properties:

| | |
|---|---|
| Appearance | Hard, spherical, water saturated, opaque beads. |
| Solids (percent) | 51–55. |
| Porosity (ml. pore/ml. bead) | 0.40–0.45. |
| Surface area (m.$^2$/g.-dry basis) | 290–330. |
| Effective size (mm.) | 0.30–0.45. |
| Harmonic mean particle size (mm.) | 0.45–0.60. |
| Average pore diameter (A.) | 85–95. |
| True wet density (g./ml.) | 1.03. |
| Skeletal density (g./ml.) | 1.06. |
| Bulk density (lb./ft.$^3$) | 40–44. |

The practice of this invention is further illustrated by the following examples.

Example 1

Crude, malodorous 2-amino-2-ethyl-1,3-propanediol (AEPD), containing about 70% by weight AEPD and 30% low-boiling alkanolamines was employed for this experiment. Water was added to provide a feedstock solution of about 16% by weight alkanolamines and 84% water. This solution had a permanganate time of 8 seconds and the color of a vinyl oxazoline drying oil prepared therefrom was 9–10 (Gardner, 1933 method).

About 3,000 g. of the feedstock solution containing about 336 g. of AEPD was taken for treatment. A resin column 1.25 inches in diameter was prepared containing 17 inches of Amberlite XAD-2 (0.012 cu. ft.). Ratio of AEPD, dry basis, to resin was 62 lb./cu. ft. The alkanolamine solution was passed upward through the column by the force of gravity feed at an average rate of 4.5 ml./minute. The first 175 ml. to come from the column was the water from the column introduced in preparing the resin bed. It was neutral to pH indicator paper and was discarded.

As the feedstock emerged from the column, the effluent was collected in 4 equal fractions. The first three were of satisfactory quality, permanganate time 8 minutes, while the fourth was still much better than the original. The first three fractions were recombined and were then distilled to 150° C. liquid temperature at 15 mm. Hg to remove low-boiling amines and alkanolamines. The substantially pure AEPD had a mild, inoffensive odor and was used in the preparation of a vinyl oxazoline drying oil as is known in the art. The color of the resulting oil was 5–6 (Gardner, 1933 method), whereas an oil made from the original, untreated sample had a color of 9–10.

Example 2

Crude, malodorous 2-amine-2-ethyl-1,3-propanediol (AEPD) was stripped of low boilers by distilling the heads through a simple still head at 15 mm. Hg pressure until the liquid temperature reached 149° C. and the corresponding vapor temperature was 141° C.

A 10% by weight aqueous solution of this material had a light transmission at 420 mμ of 71% and at 275 mμ of 0%. A vinyl oxazoline drying oil prepared from the stripped material had a color, Gardner, 1933 of 10. The pot residue was diluted to about 31% by weight with water and the resulting solution, which had a permanganate time of 7 seconds, was passed through a 1.25 inch x 16 inch column of freshly regenerated Amberlite XAD-2 resin. The ratio of alkanolamine to resin was 59 lb./ft.$^3$. The effluent had a permanganate time of 46 minutes; transmission of a 10% solution at 420 mμ was 95.9% and at 275 mμ was 64%. The effluent was concentrated by evaporation of the water therefrom and a vinyl oxazoline drying oil was prepared. It had a color, Gardner, 1933 of 6–7.

Example 3

Crude, malodorous 2-amino-2-ethyl - 1,3 - propanediol (AEPD) was vacuum distilled at 5 to 10 mm. pressure. A sample diluted to 50% weight with water had a light transmission at 420 mμ of 73%, and a 10% solution had a light transmission at 275 mμ of 12%. The vacuum distilled AEPD was dissolved in sufficient water to form a 25% feedstock solution of AEPD having a permanganate time of 6 seconds. A 3,225 ml. portion of the feedstock solution was passed through a 1.25 inch x 15.25 inch column of Amberlite XAD-2 resin at a rate of about 6.4 ml./minute. The first 12% of the effluent had a permanganate time of 35 minutes and 85% of the effluent had a permanganate time of 9 minutes or over and was determined to be of good quality. The ratio of AEPD to resin was about 120 lb./ft.$^3$ to treat 85% of the effluent. The water was evaporated and the resulting AEPD was mild-odored. It was used to prepare a vinyl oxazoline drying oil having a satisfactory color.

The remaining 15% of effluent had a permanganate time of 5 minutes and was much improved over the original. It was recycled for further treatment. The ratio of total AEPD treated to resin was about 145 lb./ft.$^3$.

Example 4

The procedure of Example 1 was repeated except that the adsorption column was operated at a temperature of from about 60° C. to 70° C. There was no significant difference in the quality of the effluent as compared with the effluent obtained with the column at room temperature.

Example 5

The mother liquor from the crystallization process for 2-amino-2-hydroxymethyl-1,3-propanediol is a mixture of by-products which is principally 2-amino-1,3-propanediol along with higher molecular weight compounds. It is very dark in color and has an offensive odor. A sample of this mother liquor was vacuum-steam distilled at 14 mm. pressure at 130–140° C. to obtain a distillate containing about 20% 2-amino-1,3-propanediol in water. A 582 ml. portion of this solution (2.26 N in base) was passed through a 1.25 by 15 inch column of Amberlite XAD-2 resin at about 7 ml./minute. The light transmission of this solution diluted to 1 normal and the permanganate times of the 2.26 normal solution before and after contact with XAD-2 are as follows:

| Solution | Light transmission, percent | | Permanganate time (minutes) |
|---|---|---|---|
| | 420 mμ | 275 mμ | |
| Before contact | 94.2 | 3.2 | 1.2 |
| After contact | 98.1 | 27.7 | 3.2 |

The odor of the treated solution was mild and inoffensive. The treated alkanolamine was determined to be satisfactory for the preparation of light-colored emulsions.

Example 6

Crude, malodorous 2-amino-2-methyl-1,3-propanediol (AMPD), 60% by weight concentrate, was distilled through a simple still head to 147° liquid temperature, 141° vapor temperature at 15 mm. to remove water and low boiling alkanolamines. A portion of the residue was dissolved in water to make a 30% by weight feedstock solution. A 1,140 ml. portion of the feedstock solution was passed through a 1.25 x 17 inch column of Amberlite XAD-2 resin at about 15 ml./minute. The water was evaporated from the AMPD and the odor was determined to be mild and inoffensive. The light transmission of a 10% aqueous solution of the AMPD and the permanganate time before and after contact with Amberlite XAD-2 resin are as follows, along with the color of vinyl oxazoline drying oils prepared from the AMPD before and after contact with resin.

| Solution | Light transmission, percent | | Permanganate time (minutes) | Gardner (1933) color vinyl oxazoline oil |
| --- | --- | --- | --- | --- |
| | 420 mμ | 275 mμ | | |
| Before contact | 98.0 | 52.0 | 6 | 8 |
| After contact | 99.8 | 74.2 | 21 | 7 |

Example 7

The experiment of Example 2 is repeated except that crude, malodorous 2-amino - 2 - hydroxymethyl-1,3-propanediol is substituted for the AEPD. The resulting alkanolamine is mild in odor and is suitable for the preparation of a vinyl oxazoline drying oil.

Example 8

The experiment of Example 1 is repeated except that a solution of 2-amino-2-propyl-1,3-propanediol (APPD) is substituted for 2-amino - 2 - ethyl - 1,3 - propanediol. Purified APPD suitable for use in the preparation of oxazoline drying oils is obtained.

Example 9

A 2-liter portion of a 30% aqueous solution of crude, malodorous, highly-colored AEPD was passed through a 1.25 x 17 inch column of Amberlite XAD-1 resin. For comparison, a second 2-liter portion of the same solution was passed through a similar column of XAD-2 resin. The effluents from each column were divided into four portions and the permanganate times were determined. The light transmission was determined on samples after dilution to 1 normal. The results are as follows:

| | Light transmission, percent | | Permanganate time (seconds) |
| --- | --- | --- | --- |
| | 420 mμ | 275 mμ | |
| Before treatment | 94.1 | 13.0 | |
| A. After treatment with XAD-1 resin: | | | |
| 1st 25% effluent | 96.7 | 72.0 | 72 |
| 2nd 25% effluent | 98.5 | 63.8 | 20 |
| 3rd 25% effluent | 96.2 | 54.9 | 10 |
| 4th 25% effluent | 96.0 | 52.5 | 10 |
| B. After treatment with XAD-2 resin: | | | |
| 1st 25% effluent | 95.9 | 80.1 | 3,060 |
| 2nd 25% effluent | 95.3 | 76.1 | 1,500 |
| 3rd 25% effluent | 96.1 | 72.5 | 180 |
| 4th 25% effluent | 97.3 | 70.5 | 60 |

The first two effluent fractions from the XAD-1 resin were greatly improved in odor and color by comparison with the original. These fractions were determined to be satisfactory for use in preparation of emulsions. The second two fractions were reserved for recycle.

What is claimed is:
1. A process for the purification of a malodorous alkanolamine containing color-producing impurities, said alkanolamines corresponding to the formula:

$$HO-CH_2-\underset{\underset{NH_2}{|}}{\overset{\overset{R}{|}}{C}}-CH_2OH$$

wherein R is hydrogen, an alkyl radical of 1 to 3 carbon atoms or hydroxymethyl, comprising contacting an aqueous solution of said alkanolamine with a resin capable of adsorbing said malodorous, color-producing impurities, said resin comprising a cross-linked copolymer of styrene with divinylbenzene, in an amount sufficient to effect substantial adsorption of said malodorous, color-producing impurities from said alkanolamine.

2. The process of claim 1 wherein the aqueous solution contains from about 15% to about 40% by weight of alkanolamine.

3. The process of claim 1 wherein the rate of flow is from about 20 gal./hour of a 20% by weight alkanolamine solution to about 40 gal./hour of a 40% by weight alkanolamine solution.

4. The process of claim 1 wherein the ratio of alkanolamine is from about 20 lb. to about 260 lb. per cubic foot of resin.

5. The process of claim 1 wherein the ratio of alkanolamine is from about 20 lb. to about 150 lb. per cubic foot of resin.

6. The process of claim 1 wherein the styrene-divinylbenzene copolymer is Amberlite XAD-2.

7. The process of claim 1 wherein the styrene-divinylbenzene copolymer is Amberlite XAD-1.

8. The process of claim 1 wherein the alkanolamine is 2-amino-1,3-propanediol.

9. The process of claim 1 wherein the alkanolamine is 2-amino-2-methyl-1,3-propanediol.

10. The process of claim 1 wherein the alkanolamine is 2-amino-2-ethyl-1,3-propanediol.

11. The process of claim 1 wherein the alkanolamine is 2-amino-2-hydroxymethyl-1,3-propanediol.

12. The process of claim 1 wherein the alkanolamine is 2-amino-2-propyl-1,3-propanediol.

13. A process for the purification of a malodorous alkanolamine containing color-producing impurities and low-boiling impurities, said alkanolamine corresponding to the formula:

$$HO-CH_2-\underset{\underset{NH_2}{|}}{\overset{\overset{R}{|}}{C}}-CH_2OH$$

wherein R is hydrogen, an alkyl radical of 1 to 3 carbon atoms or hydroxymethyl, comprising
(a) heating said alkanolamine to a temperature of about 150° C. at a pressure of about 15 mm. to effect removal by distillation of said low-boiling impurities,
(b) dissolving said alkanolamine in sufficient water to form an aqueous solution of from about 15% to about 40% by weight of said alkanolamine,
(c) contacting said alkanolamine solution with Amberlite XAD-2 non-ionic adsorption resin in a ratio of from about 20 lb. to about 150 lb. of alkanolamine, dry basis, per cubic foot of resin to effect substantial removal of said malodorous, color-producing impurities.

14. A process for the purification of a malodorous alkanolamine containing color-producing impurities and low-boiling impurities, said alkanolamine corresponding to the formula:

$$HO-CH_2-\underset{\underset{NH_2}{|}}{\overset{\overset{R}{|}}{C}}-CH_2OH$$

wherein R is hydrogen, an alkyl radical of 1 to 3 carbon atoms or hydroxymethyl, comprising
(a) heating said alkanolamine to a temperature of about 100° C. at ambient pressure to effect removal by distillation of a first portion of said low-boiling impurities,
(b) dissolving said alkanolamine in sufficient water to form an aqueous solution of from about 15% to about 40% by weight of said alkanolamine, (c) contacting said alkanolamine solution with Amberlite XAD-2 non-ionic adsorption resin in a ratio of from about 20 lb. to about 150 lb. of alkanolamine, dry basis, per cubic foot of resin to effect substantial removal of said malodorous, color-producing impurities, (d) heating said alkanolamine to a temperature of about 150° C. at a pressure of about 15 mm. to effect removal by distillation of remaining portion of said low-boiling impurities.

References Cited

UNITED STATES PATENTS

| | | | |
|---|---|---|---|
| 3,151,166 | 9/1964 | Milligan | 260—584 |
| 3,207,790 | 9/1965 | Glew et al. | 260—584 |

CHARLES B. PARKER, *Primary Examiner.*

R. L. RAYMOND, *Assistant Examiner.*

U.S. Cl. X.R.

260—708; 252—354